US011516756B2

(12) United States Patent
Hasnain et al.

(10) Patent No.: US 11,516,756 B2
(45) Date of Patent: Nov. 29, 2022

(54) SCHEDULER OPTIMIZATION FOR OFDMA DOWNLINK TRANSMISSIONS

(71) Applicant: HEWLETT PACKARD ENTERPRISE DEVELOPMENT LP, Houston, TX (US)

(72) Inventors: Farhan Hasnain, Santa Clara, CA (US); Mohd Shahnawaz Siraj, Santa Clara, CA (US); Eldad Perahia, Park City, CA (US); Deven Patel, Santa Clara, CA (US); Sachin Ganu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 64 days.

(21) Appl. No.: 17/216,458

(22) Filed: Mar. 29, 2021

(65) Prior Publication Data
US 2022/0312344 A1    Sep. 29, 2022

(51) Int. Cl.
*H04W 52/36* (2009.01)
*H04W 52/34* (2009.01)
*H04L 1/00* (2006.01)
*H04W 52/52* (2009.01)
*H04W 84/12* (2009.01)

(52) U.S. Cl.
CPC ......... *H04W 52/367* (2013.01); *H04L 1/0003* (2013.01); *H04W 52/343* (2013.01); *H04W 52/52* (2013.01); *H04W 84/12* (2013.01)

(58) Field of Classification Search
CPC . H04W 52/367; H04W 52/343; H04W 52/52; H04W 84/12; H04L 1/0003
See application file for complete search history.

(56) References Cited

U.S. PATENT DOCUMENTS

| 8,031,662 | B2 | 10/2011 | Lee et al. |
| 9,949,278 | B2 | 4/2018 | Khandekar et al. |
| 2017/0238232 | A1 | 8/2017 | Yang et al. |

(Continued)

FOREIGN PATENT DOCUMENTS

KR    20120055343    5/2012

OTHER PUBLICATIONS

Baghani, M. et al., Downlink Resource Allocation in OFDMA Wireless Networks Under Power Amplifier Nonlinearity, (Research Paper), IET Communications, Dec. 21, 2017, pp. 2751-2757, vol. 11, No. 18, The Institution of Engineering and Technology.

*Primary Examiner* — Jianye Wu
(74) *Attorney, Agent, or Firm* — Sheppard Mullin Richter & Hampton LLP

(57) ABSTRACT

Systems and methods are provided for optimizing the scheduling of Orthogonal Frequency-Division Multiple Access (OFDMA) transmissions in the downlink (DL) direction. A two-stage mechanism can be implemented when effectuating DL OFDMA transmission involving multiple modulation and coding schemes (MCS) in a single transmit burst. A first stage of the two-stage mechanism may use radio frequency (RF) boosting/de-boosting of Resource Units (RUs) such that the average input power to an AP power amplifier (PA) may remain under a saturated PA output power to ensure PA linearity. If RF boosting/de-boosting is not supported, an alternative mechanism for OFDMA grouping (to rigid grouping) can be employed to skip higher MCS.

20 Claims, 9 Drawing Sheets

(56) References Cited

U.S. PATENT DOCUMENTS

2017/0359158 A1* 12/2017 Lim ................... H04L 1/0001
2019/0230674 A1*  7/2019 Cheng ............... H04W 72/044
2021/0235309 A1*  7/2021 Noh .................. H04W 72/042

* cited by examiner

| TX Rates | PA Linearity Based Max (dBm) | Grouping Example Based Max (dBm) |
|---|---|---|
| MCS0 | 18 | 17 |
| MCS1 | 17.5 | |
| MCS2 | 17 | |
| MCS3 | 16.5 | 15.5 |
| MCS4 | 16 | |
| MCS5 | 15.5 | |
| MCS6 | 15 | 13 |
| MCS7 | 14 | |
| MCS8 | 13 | |
| MCS9 | 12 | 10 |
| MCS10 | 11 | |
| MCS11 | 10 | |

FIG. 5

SCHEDULER OPTIMIZATION FOR OFDMA DOWNLINK TRANSMISSIONS

DESCRIPTION OF THE RELATED ART

Wireless digital networks are becoming ubiquitous in enterprises, providing secure and cost-effective access to resources. Those networks usually have one or more controllers, each controller supporting a plurality of access points (AP) deployed through the enterprise. WiFi networks operating in accordance with IEEE 802.11 standards are examples of such networks. Wireless network communications devices (also referred to as stations or client devices), such as personal computers and mobile phones transmit data across wireless digital networks vis-à-vis WiFi APs, and cellular network APs, for example.

BRIEF DESCRIPTION OF THE DRAWINGS

The present disclosure, in accordance with one or more various embodiments, is described in detail with reference to the following figures. The drawings are provided for purposes of illustration only, and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

FIG. 5 illustrates an example of conventional rigid orthogonal frequency division multiple access grouping.

Figure 1:
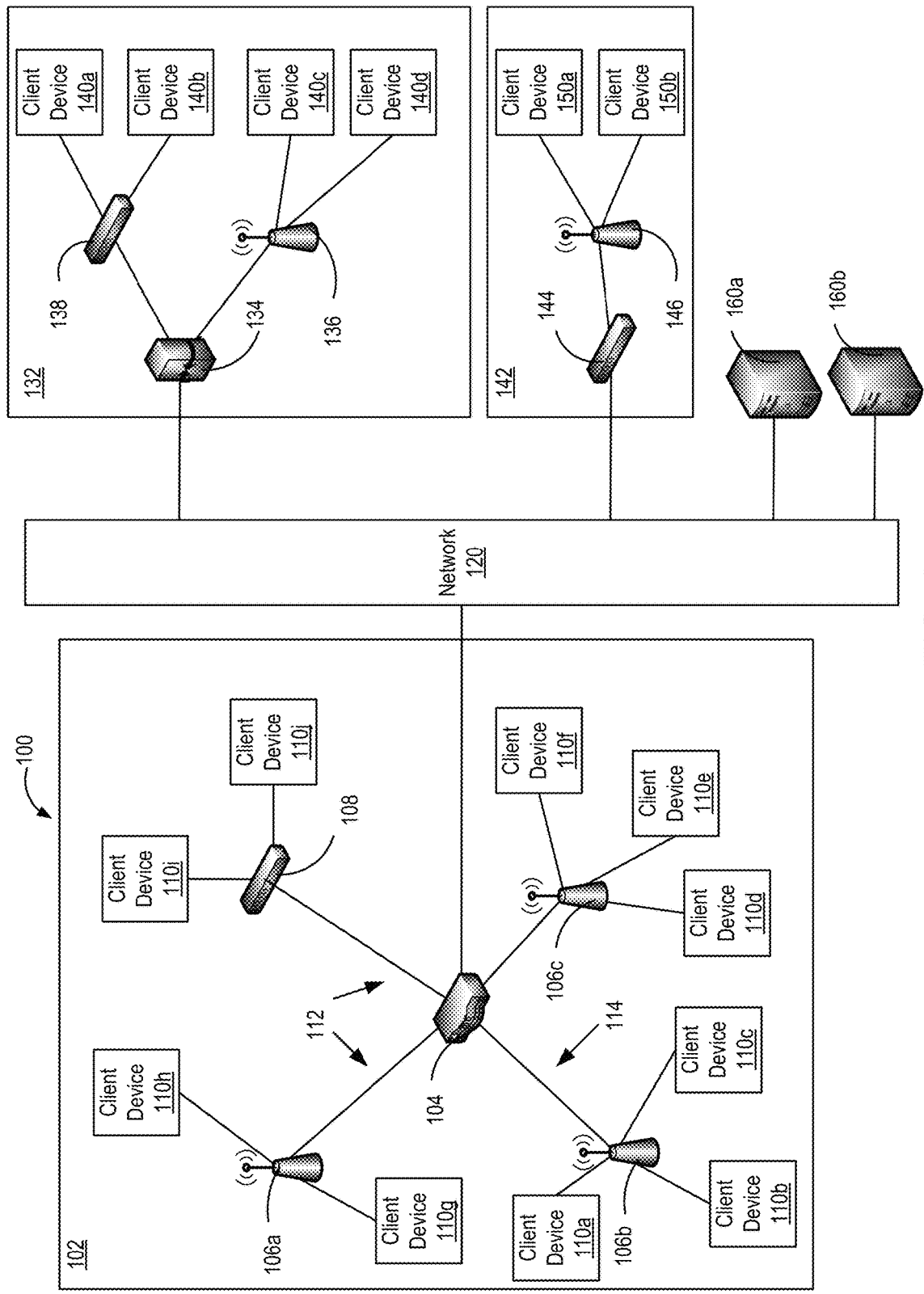
FIG. 1 is a schematic block diagram illustrating an example network configuration in which the technology described herein may be implemented.

The figures are not intended to be exhaustive or to limit various embodiments to the precise form disclosed. It should be understood that various embodiments can be practiced with modification and alteration.

DETAILED DESCRIPTION

Various embodiments disclosed in the present application are directed to a computer-implemented system and method of optimizing the scheduling of Orthogonal Frequency-Division Multiple Access (OFDMA) transmissions in the downlink (DL) direction (from an AP to a client device). A two-stage mechanism can be implemented when effectuating DL OFDMA transmission involving multiple modulation and coding schemes (MCS) in a single transmit burst. A first stage of the two-stage mechanism may use radio frequency (RF) boosting/de-boosting of Resource Units (RUs) such that the average input power to an AP power amplifier (PA) may remain under a saturated PA output power to ensure PA linearity. If RF boosting/de-boosting is not supported, an alternative mechanism for OFDMA grouping (to rigid grouping) can be employed to skip higher MCS.

To provide background/context, the aforementioned feature known as OFDMA is an "access" technique, an refers to a version of Orthogonal Frequency-Division Multiplexing (OFDM) that was introduced in the Institute of Electrical and Electronics Engineers (IEEE) 802.11ax. OFDMA allows for dedicating different sub-carriers to different clients within one transmission burst. In particular, OFDMA enables concurrent AP communication in both the DL and uplink (UL) directions with multiple client devices by assigning subsets of subcarriers, referred to as RUs to those individual client devices. The 802.11ax standard utilizes OFDMA technology for efficient access. This is in contrast to OFDM technology which does not allow for different modulations/transmit powers to be used on different data subcarriers within one transmission burst. All subcarriers within one data symbol and hence all data symbols within one transmit burst would have the exact same modulation and transmit (TX) power would be equally divided among all data subcarriers. Of course, the two WiFi bands (2.4 GHz and 5 GHz) would need to comply with band specific PSD (Power Spectral Density) requirements to remain FCC-compliant.

An OFDM symbol may be thought of as a basic building block of a WiFi transmission. That is, an OFDM symbol is a small segment in time of modulated subcarriers, carrying information. In 802.11ax, subcarrier spacing was changed to allow for OFDMA to extend to small sub-channels (defined in the standard), each sub-channel having at least one (but usually two) pilot subcarriers. With a 2 MHz minimum sub-channel size, a smaller subcarrier spacing loses a smaller percentage of the overall bandwidth to pilots. Moreover, the number of guard and null subcarriers across a channel can also be reduced as a percentage of the number of useable subcarriers, which in turn results in an increase in the effective data rate of a given channel.

OFDMA works by dividing a transmission across the frequency dimension, with pairs of devices assigned to transmit and receive in sub-channels or RUs of a main RF channel. This allows an AP (in the downlink) to bundle multiple frames together in different sub-channels in a single transmit burst opportunity, while the AP's associated client devices tune their respective radios to different sub-channels to receive their respective transmissions. In particular, an AP may assemble a number of frames for different client devices, and modulates them over a set of allocated sub-channels. Padding can be added to a frame when the frame is shorter than a longest frame of a bundle.

RUs can contain a significantly less number of sub-carriers dedicated to one client device. For example, in accordance with the 802.11ac standard, all 52 data subcarriers in a 20 MHz channel bandwidth would be allocated to one client per transmit burst. In contrast, and in an 802.11ax 20 MHz channel bandwidth, nine 2 MHz RUs can be allocated to nine different client devices, where theoretically, all of the client devices can have different modulations and transmit powers within one transmit burst. The minimum number of subcarriers per client device can be 26, which forms an approximately 2 MHz RU. The number of subcarriers within a dedicated RU to a user can range from 26 to 996 depending upon client requirements and channel bandwidth being used.

A purported fundamental advantage to using OFDMA is the reduction in latency for all client devices in general. For example, with 802.11ac OFDM transmissions, one transmit burst can cater either to higher modulation client devices with a high Signal-to-Noise ratio (SNR) that are located closer to APs, or to lower modulations client devices with relatively lower SNR that are farther away from the APs. However, OFDM is not capable of supporting both client device types at the same time. OFDMA technology in the 802.11ax standard does—it can cater to both client device types (high modulation/close and low modulation/far) within one transmit burst. Thus, OFDMA inherently promises lower overall latency in a WiFi cell by making "efficient" use of the available RF spectrum. Hence, the association "High Efficiency," i.e., 802.11ax High Efficiency WLAN allows for scheduling multi-user DL and UL transmissions.

However, although the 802.11ax standard allows for the presence of varying modulations and transmit powers within one transmit burst, PA linearity is challenged, and thus, a PA's ability to preserve its signal quality over distances, may be sacrificed. Linearity in the RF sense refers to the PA's objective of increasing the power level of an input signal without otherwise altering the content of that signal. In other words, a linear PA is an electronic circuit whose output is proportional to its input, but is nevertheless able to deliver more power into a load.

Common WiFi deployments, at a high level, can be grouped into two categories. A first type of WiFI deployment can be referred to as a dense deployment which caters to high throughput client devices. A second type of WiFI deployment can be referred to as a relatively sparse deployment, which is typically geared towards covering long ranges of low throughout client devices. Ideally, the fastest throughout over long distances would be desirable, but the physics of RF front end design is incapable of addressing both types of deployments/client devices at the same time. Although more advanced PAs may be able to boost the range of higher modulations client devices, the throughput versus range tradeoff will always exist for any given PA. In addition to cost and power consumption, using high linearity PAs forces a design to use sophisticated thermal solutions because of the heat generated due to their higher power consumption, which also results in increased cost. Hence, using very high linearity and expensive PAs to overcome signal quality issues arising from varying powers in OFDMA transmissions can be considered to be an inefficient and non-optimized engineering design.

Some 802.11ax WiFi radio chip vendors are addressing the PA linearity issue associated with OFDMA transmissions by grouping client devices with similar rates (and hence TX power) within one PA burst. However, such a rigid grouping algorithm can be restrictive, and can ultimately diminish the improved latency promises of the 802.11ax standard. Therefore, as alluded to above, and as described in detail below, optimization techniques are disclosed to enhance the existing OFDMA downlink scheduler algorithm/mechanism to improve latency without running afoul of PA linearity. This can be accomplished by first attempting selective RF boosting/de-boosting of RUs to accommodate both high SNR/close proximity client devices and lower SNR client devices that are further from an AP. The manner in which the boosting/de-boosting may follow an algorithm that allows summation of all transmit powers across all RUs in a transmit burst to remain some threshold amount of power (in dB) backed off from the saturated output power of the PA such that after the back-off, the total power is less than the most complex modulation-limited power for that transmit burst.

If such selective RF boosting/de-boosting is not supported, an enhanced OFDMA grouping mechanism can be applied to skip higher transmission/MCS rates. In particular, based on an OFDMA candidate list (where client devices have been grouped according to a conventional rigid grouping algorithm), the grouping is enhanced. That is, the rigid grouping of client devices can be enhanced or refined to create larger groups that encompass client devices across more MCS rates, while those client devices can still be accommodated in a single transmit burst using PA powers that are sufficiently proximate to each other such that, again, PA linearity can be maintained.

FIG. 1 illustrates one embodiment of a network configuration 100 that may be implemented for a multi-user organization, such as a business, educational institution, governmental entity, or any other organization having multiple users and possibly multiple physical or geographical sites. The network configuration 100 may include a main office 102 in communication with a network 120. The network configuration 100 may also include one or more remote sites 132, 142, that are in communication with the network 120.

The main office 102 may include a primary network, which can be referred to as a corporate network or a home network. The main office 102 network may be a private network. A private network can refer to a network that may include security and access controls, such that only certain users are authorized to access the private network. Authorized users may include, for example, employees of a company based in the main office 102.

In the illustrated example, the main office 102 includes a controller 104 in communication with the network 120. The controller 104 may provide communication with the network 120 for the main office 102, though it may not be the only point of communication with the network 120 for the main office 102. A single controller 104 is illustrated, though the main office may include multiple controllers and/or multiple communication points with network 120. In some embodiments, the controller 104 communicates with the network 120 through a router (not illustrated). In other embodiments, the controller 104 provides router functionality to the devices in the main office 102.

A controller 104 may be operable to configure and manage network devices, such as at the main office 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless APs 106a-c. Switches 108 and wireless APs 106a-c provide network connectivity to various client devices 110a-j. Using a connection to a switch 108 or AP 106a-c, a client device 110a-j is able to access network resources, including other devices on the (main office 102) network and the network 120.

Examples of client devices include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, and the like.

Within the main office 102, a switch 108 is included as one example of a point of access to the network established in main office 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in main office 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over either wired 112 or wireless 114 connections.

The network configuration 100 may include one or more remote sites 132. A remote site 132 may be located in a different physical or geographical location from the main office 102. In some cases, the remote site 132 may be in the same geographical location, or possibly the same building, as the main office 102, but lacks a direct connection to the network located within the main office 102. Instead, remote site 132 may utilize a connection over a different network, e.g., network 120. A remote site 132 such as the one illustrated in FIG. 1 may be, for example, a satellite office. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 is in direct communication with main office 102, such that client devices 140a-d at the remote site 132 access the network resources at the main office 102 as if these clients devices 140a-d were located at the main office 102. In such embodiments, the remote site 132 is managed by the controller 104 at the main office 102, and the controller 104 provides the necessary connectivity, security, and accessibility that enable the remote site 132's communication with the main office 102. Once connected to the main office 102, the remote site 132 may function as a part of a private network provided by the main office 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the main office 102, such that the client devices 150a-b at remote site 142 access network resources at the main office 102 as if these client devices 150a-b were located at the main office 102. The remote site 142 may be managed by the controller 104 at the main office 102 to make this transparency possible. Once connected to the main office 102, the remote site 142 may function as a part of a private network provided by the main office 102.

The network 120 may be a public network, such as the Internet. A public network is a network that may be shared by any number of entities, including the illustrated network configuration 100. A public network may have unrestricted access, such that any user may connect to it. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a j, 140a-d, 150a-b may request and access the multimedia content provided by the content servers 160a-b.

Figure 2:
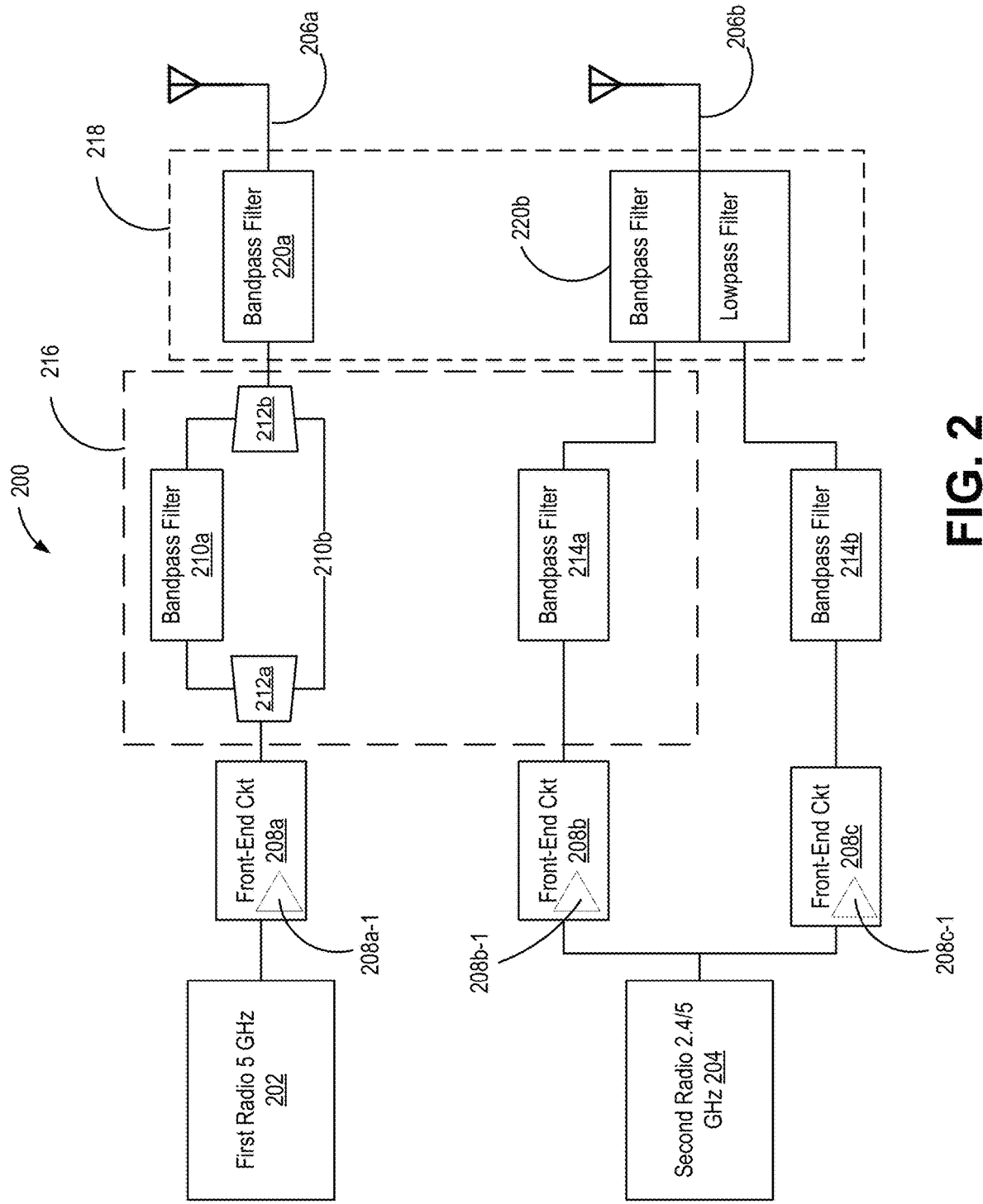
FIG. 2 illustrates example circuitry of an example access point in which the technology described herein may be implemented.

FIG. 2 illustrates example radio circuitry 200 of an example AP, e.g., one of the APs of network configuration 100 (FIG. 1). It should be understood that this is merely one, non-limiting example of an AP, and various embodiments are applicable to any/all 802.11ax-compliant APs. Radio circuitry 200 may include multiple components electrically coupled via traces on a printed circuit board. In some examples, radio circuitry 200 may be contained within a system on a chip (SOC). In some other examples, radio circuitry 200 is a combination of a SOC and other discrete components. For example, certain radio circuitry 200 may include an integrated circuit for each radio 202 and 204, an integrated circuit for each front-end circuitry 208a-c, and discrete components for sub-band filter 216 and band filter 218. As another example, the radio circuitry of first radio 202 (including front-end circuitry 208a, RF switches 212, sub-band filters 210, band filter 220a, and antenna 206a) is contained within a SOC, and the radio circuitry of second radio 204 is contained within another SOC. Although certain specific examples of the physical layout of radio circuitry 200 have been discussed, this disclosure contemplates any physical arrangement of components, integrated circuits, and SOCs as appropriate.

In example radio circuitry 200, first radio 202 may be capable of transceiving signals on channels within the 5 GHz frequency band. In certain examples, first radio 202 is capable of transceiving signals within any appropriate frequency band, but the band filter 218 and the sub-band filter 216 restrict first radio 202 to transceiving signals within the 5 GHz frequency band. In certain configurations, first radio 202 may be able to transceive signals within a sub-band of the 5 GHz frequency band. Although first radio 202 is described in relation to transceiving signals on the 5 GHz frequency hand, it is contemplated that first radio 202 could transceive signals on any appropriate frequency band, including the 2.4 GHz frequency band.

First radio 202 is coupled to front-end circuitry 208a. In some examples, front-end circuitry 208a includes one or more PAs, e.g., PA 208a-1, one or more low noise amplifiers, one or more power detectors, and RF switches to bypass portions of front-end circuitry 208a. In certain examples, front-end circuitry 208a may also be called a front-end module. In this disclosure, the term "RF switch" may refer to a device capable of routing an RF signal along one of two paths based on an input. This is in contrast to a "network switch," which is a networking component for routing packets to a destination device. In certain examples, front-end circuitry 208a includes power amplifiers. In certain other examples, front-end circuitry 208a includes low noise amplifiers. Coupled to front-end circuitry 208a is sub-band filter 216. For the antenna circuitry coupled to first radio 202, sub-band filter 216 may include a band-pass filter 210a and a bypass 210b controlled by single-pole double-throw (SPDT) RF switches 212. In some examples, RF switches 212 toggle the antenna circuit between 5 GHz mode, and a 5 GHz sub-band mode. Sub-band filter 216 is coupled to band filter 218, which includes band-pass filter 220a. Band-pass filter 220a filters signals so that signals within the 5 GHz frequency band pass through band filter 218. Band filter 218 is coupled to antenna 206a.

In one example configuration, a signal is received at antenna 206a. The signal may include noise, which may include signals from undesired sources, harmonic signals from desired sources, and distortions of the signal as transmitted. By passing the signal through band filter 218, band-pass filter 220a filters out all portions of the signal that are not within the desired frequency band. From band filter 218, the signal proceeds to sub-band filter 216. RF switch 212b routes the signal to band-pass filter 210a, which, similar to band-pass filter 220a, filters out all undesired portions of the signal. Band-pass filter 210a filters all portions of the signal that are not within a desired sub-band of the desired frequency band. The signal then proceeds through RF switch 212a and out of sub-band filter 216 to front-end circuitry 208a. Front-end circuitry 208a receives the signal and amplifies it. In some examples, front-end circuitry 108a further reduces noise in the signal while amplifying the desired portions of the signal. From front-end circuitry 208a, the signal passes to first radio 202, which processes the signal for use in network communications. In another example configuration, a signal is received at antenna 206a. From band filter 218, the signal proceeds to sub-band filter 216. RF switch 212b routes the signal to bypass 210b, avoiding band-pass filter 210a. Since no sub-band filtering occurs, the signal is still filtered to the desired frequency band. The signal then proceeds through RF switch 212a and out of sub-band filter 216 to front-end circuitry 208a. Front-end circuitry 208a receives the signal and amplifies it. In some examples, front-end circuitry 208a further reduces noise in the signal while amplifying the desired portions of the signal. From front-end circuitry 208a, the signal passes to first radio 202, which processes the signal for use in network communications.

In example radio circuitry 200, second radio 204 is capable of transceiving signals on channels within the 5 GHz frequency band and on channels within the 2.4 GHz frequency band. In certain examples, second radio 204 is capable of transceiving signals within any appropriate frequency band, but the band filter 218 and the sub-band filter 216 restrict second radio 204 to transceiving signals within the 5 GHz and 2.4 GHz frequency band, but second radio 204 could transceive signals on any appropriate frequency band.

Second radio 204 is coupled to front-end circuitry 208b and 208c. In some examples, front-end circuitry 208b and 208c each include at least one PA, e.g., PA 208b-1 and PA 208b-2, at least one low noise amplifier, at least one power detector, and multiple RF switches to bypass portions of front-end circuitry 208b and 208c. In certain examples, front-end circuitry 208b and 208c may also be called a front-end module. Coupled to front-end circuitry 208b and 208c, respectively, is sub-band filter 216. For the antenna circuitry coupled to second radio 204, sub-band filter 216 may include a band-pass filter 214a. Front-end circuitry 208b is coupled to band-pass filter 214a and front-end circuitry 208c is coupled to band-pass filter 214b. In some examples, second radio 204 is configured in one of: a 5 GHz sub-band mode, and a 2.4 GHz mode. Sub-band filter 216 is coupled to band filter 218, which includes filter 220b. Filter 220b filters signals so that signals within the desired frequency band pass through band filter 218. Band filter 218 is coupled to antenna 106b. Signals received at antenna 206b may processed similar to the manner in which signals received at antenna 206a are processed via filter 220b, one of bandpass filters 214a/214b, one of front-end circuitry 208b/208c, and on to second radio 204, which processes the signal for use in network communications.

Conventionally-implemented rigid grouping of clients according to MCS typically results in the selection of a minimum TX power for different modulations within an OFDMA transmit burst. However, this rigid grouping scheme has a shortcoming in that it does not allow for the presence of/communications with a "distant" client device (within a single transmit burst), which is forced to use lower rates such as MCS0 due to SNR degradation arising from higher path loss. Depending upon the latency needs of higher modulation client devices, this can lead to significantly worse latency for the client device using MCS0. It should be understood that that MCS are used to determine the data rate of a wireless connection. Although certain examples/scenarios described herein refer to a particular set of MCS, i.e., MCS0-MCS11, more MCS may be defined by the 802.11xx standard. Various embodiments can be adaptable across other MCS/MCS sets.

In accordance with one embodiment, boosting and de-boosting of RUs such that the average input power to the PA in time domain is 6-8 dB below Psat (saturated output power of the amplifier) of the PA. The examples described herein may refer to certain MCS, transmit powers, power thresholds/boundaries, etc. It should be understood that transmission powers corresponding to a particular MCS refers to a characteristics of a given PA, and so such transmit powers, power thresholds, etc. may differ and are configurable depending on the system, PAs utilized in APs, and so on. Achieving this 6-8 dB back-off can ensure that the PA is linear enough for MCS9-MCS11 on all RUs, but also allows the use of a few RUs at higher power to cater to the SNR of distant MCS0 or low-MCS client devices.

Figure 3:
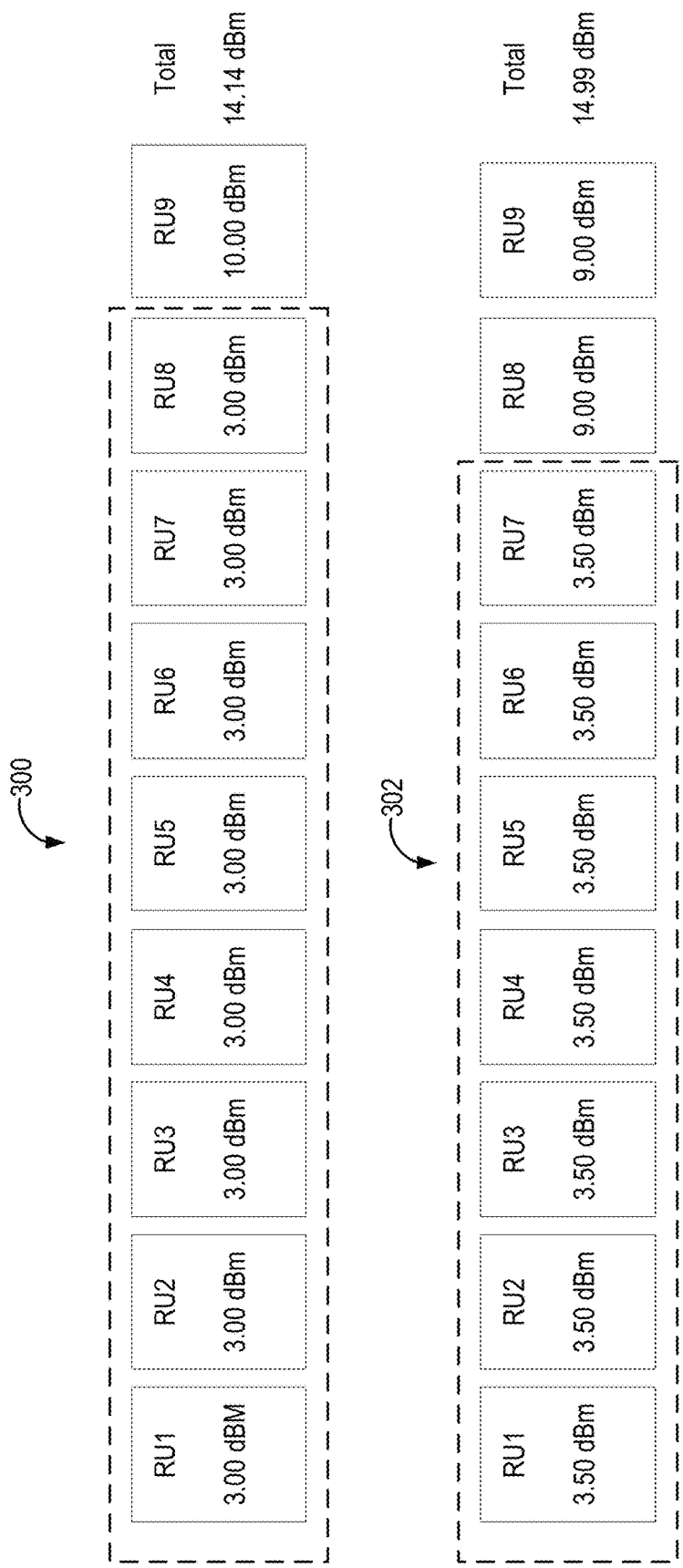
FIG. 3 illustrates examples of resource unit boosting/de-boosting in accordance with various embodiments.

FIG. 3 illustrates two examples of such boosting/de-boosting using 26-tone RUs in a 20 MHz channel. As illustrated in FIG. 3, a first boosting/de-boosting example 300 involves nine client devices with which an AP may communicate using nine approximately 2 MHz RUs. In this first boosting/de-boosting example 300, it can be appreciated that the client devices associated with RU1-RU8 are proximate/near to the AP and may be high throughput client devices. The power used to communicate with such client devices may be approximately 3.00 dBm, while the power used to communicate with the client device (that may be further away from the AP) using RU9 may be approximately 10 dBm. The total power across all RUs is 14.14 dBm (understanding that dBm is a logarithmic power unit, i.e., the sum of all the powers is typically calculated by first converting the logarithmic values into linear values, adding the linear values, and converting the linear sum back into a logarithmic value).

A second boosting/de-boosting example 302 illustrated in FIG. 3 involves seven client devices with which an AP communicates using RU1-RU7, respectively, at a power of 3.5 dBm. These client devices are close to the AP and are high throughput client devices. In contrast, client devices with which the AP communicates using RU8 and RU9 are client devices that can be further away (relatively) from the AP and are lower throughput client devices. In this example 302, the total power across all RUs is 14.99 dBm. It should be appreciated that in both examples, distantly-located client devices can be serviced at approximately 6 dB higher power that can provide a significant advantage in the context of sparse deployments.

In conventional systems/using conventional mechanisms, a single PA transmission could not accommodate both types of clients described above. To accommodate a client that is further away from an AP (requiring higher power), PA linearity is limited, i.e., boosting power of an RU results in more difficulty keeping input signals proportional to output signals of the PA. Thus, instead of equally dividing power amongst all RUs (as may be done conventionally), the power of RUs used to access/communicate with client devices that are further away from the AP can be boosted, while the power of RUs used to access/communicate with client devices that are closer to the AP can be reduced, i.e., de-boosted. When using typical, median PAs, a total average power across, in these examples, a 20 MHz channel of 14.14 dBm or 14.99 dBm is approximately 6-8 dBms less than the Psat of such PAs. Operation of a PA at approximately 6-8 dBm below its Psat, results in linear operation of the PA, which in turn results in maintaining the quality of the signal output from the PA. In this way, both types of client devices are accommodated, and this can be accomplished without sacrificing PA linearity.

In accordance with one embodiment, a boosting/de-boosting algorithm is used to determine the requisite power distribution across the multiple RUs for a single transmit burst. The algorithm described below is one example of effectuating boosting/de-boosting, but other algorithms may be used/developed to accomplish the desired power distribution in other contemplated embodiments.

$$\sum_{i=1}^{m} P_{LowMSC,i} + \sum_{i=m+1}^{n} P_{HighMSC,i} \leq P_{sat} - x$$

It should be understood that: m can refer to the total number of low MCS RUs, n can refer to the total number of RUs in an OFDMA transmit burst; $P_{low\ MCS,\ i}$ can refer to the power of the $i^{th}$ low MCS RU, while $P_{high\ MCS,\ i}$ can refer to the power of the $i^{th}$ high MCS RU. In general, the boosting/de-boosting of RU powers should be some desired amount less than the $P_{sat}$ of the PA to maintain linearity, i.e., the summation of all RU powers should be "x" dBs backed-off/less than the $P_{sat}$ such that $P_{sat}$–x dBm is equal to or less than the most complex modulation limited power in a particular transmit burst. In other words:

$$\sum_{i=m+1}^{n} P_{RU,i} \leq P_{sat} - x$$

∀($P_{sat}$–x)≤1024QAM or 4096QAM limited power for a given PA

That is, the total power of low MCS RUs plus the total power of high MCS RUs should be the desired 6-8 dB less than the PA Psat. The practical effect is that low MCS RUs are separated from high MCS RUs by approximately 6-8 dB, where the function is bound to be no more than 12 dB in difference (although, as alluded to above, this is configurable). Limiting the difference can be accomplished with the following function.

|$P_{Low\ MSC,i}$–$P_{High\ MSC,i}$|≤12 dB|

Figure 4:
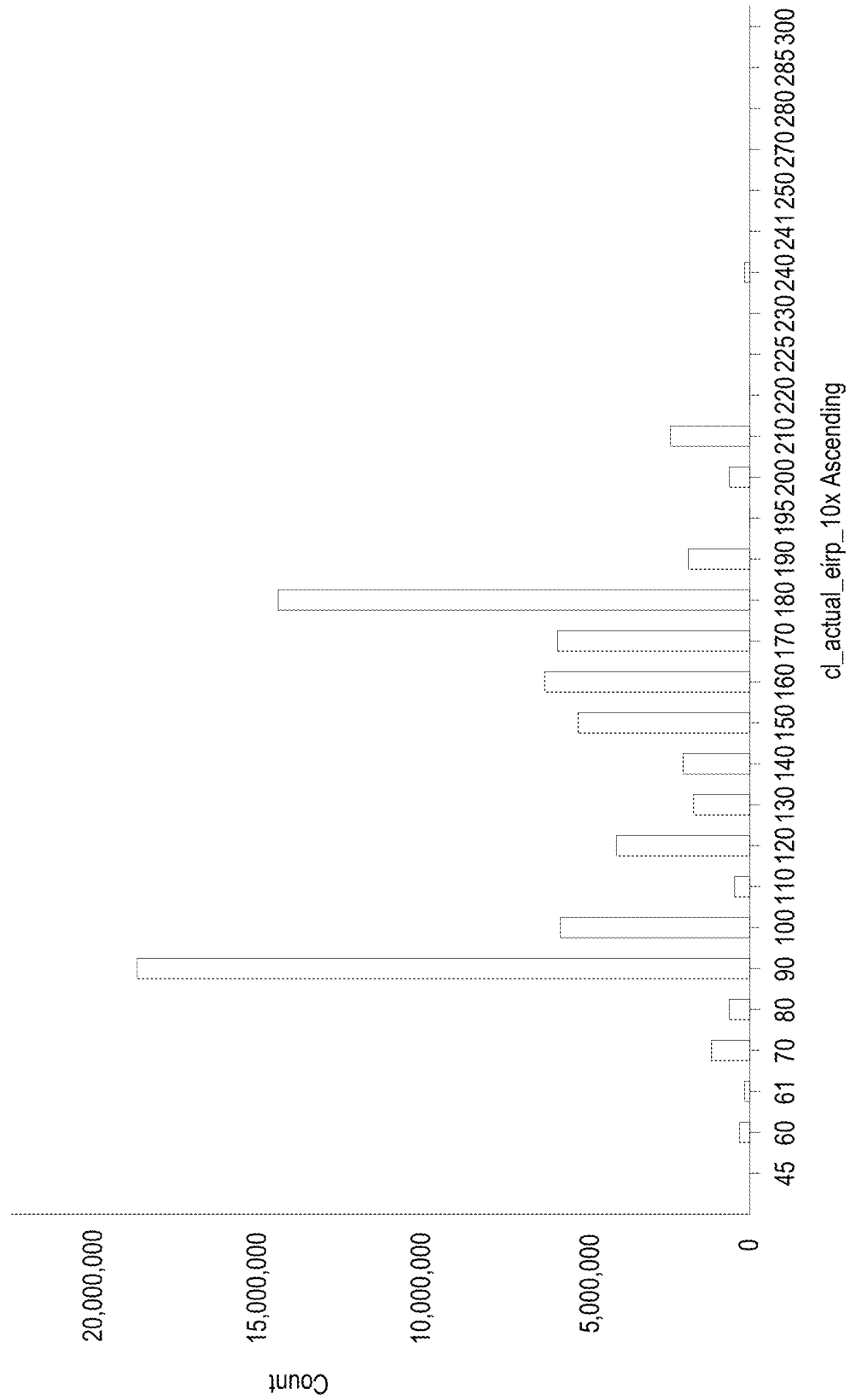
FIG. 4 illustrates an example effective isotropic radiated power histogram in accordance with various embodiments.

Referring back to FIG. 3, it can be appreciated that RU9 is separated from each of RUs1-8 by about 7 dB per the boosting/de-boosting example 300, and RU8 and RU9 are separated from each of RUs1-7 by about 5.5 dB per the boosting/de-boosting example 302. It should be noted that the power spectral density (PSD), i.e., power per MHz, per RU in these examples 300/302, are comparable to 802.11ac and 802.11n deployments, especially campus deployments. FIG. 4 illustrates an example Effective Isotropic Radiated Power (EIRP) distribution histogram representative of real-world statistics obtained from a campus deployment. The x-axis (cl_actual_eirp_10x Ascending) refers to measured/detected EIRP from APs of the campus deployment (multiplied by a power of 10). It should be understood that the multiplication factor of 10 is typically reflected in such measurements. The y-axis (Count) refers to the number of transmit power events measured every minute over several days associated with approximately 200,000 APs making up the campus deployment. Thus, the EIRP distribution histogram represents power radiated by the APs of the campus deployment.

It can be appreciated that power distribution resides mostly within the 9 dBm (90/10) to 18 dBm (180/10) range, the highest appreciable EIRP value being 21 dBm (210/10), which corresponds with the power used in approximately 2,500,000 transmit power events at the APs. As another example, almost 15,000,000 transmit power events occurred at a power of 18 dBm, while almost 18,000,000 transmit power events occurred at a power of 9 dBm. Taking the highest appreciable power, e.g., 21 dBm (210/10), and by subtracting approximately 3 dB to account for antenna gain and approximately 6 dB MIMO gain to account for multiple radio chains, e.g., in this case, a 4×4 radio, the maximum conducted power per radio chain is approximately 12 dBm. This translates into a PSD level of −1 dBm/MHz or 2 dBm per 2 MHz RU for a 20 MHz channel bandwidth that is actually lower than the 3-3.5 dBm per 2 MHz RU used for the high modulations in examples 300/302. This translation from −1 dBm/MHz to 2 dBm/2 MHz is to normalize the PSD/make it comparable to the 2 MHz RUs (of a 20 MHz channel).

That is, and referring back to FIG. 3, in the case of the first boosting/de-boosting example 300, it can be appreciated that despite boosting/de-boosting power for RUs to accommodate client devices geographically near to an AP (RU1-RU8), as well as client devices that are geographically far/farther from that AP (RU9), the amount of de-boosting applied to nearby client devices (at 3.00 dBm) is in line (from a practical standpoint) with the measured power in a typical deployment, such as a campus deployment. The same holds true for example 302, where 3.5 dBm PSD per RU is again in line with that of a typical deployment, despite now also being able to accommodate for client devices farther away (RU8-RU9) from an AP simultaneously with client devices (RU1-RU7) closer to the AP.

It should be understood that boosting/de-boosting in the 802.11ax standard is used from the MCS perspective, i.e., to balance modulation coding. This is in contrast to the manner/reason for its use in various embodiments disclosed herein, where boosting/de-boosting can be performed from the RF perspective. That is, if one client device (further away from an AP) is using MCS6, and another client device (closer to the AP) is using MCS 11, the power level for the lower MCS6 client can be boosted by approximately 3-6 dB, and the power level of the higher MCS11 client (and likely other high MCS clients) can be proportionately de-boosted such that the total power remains approximately 6 to 8 dB below Psat. Practically speaking, however, AP vendors' scheduling algorithm(s) (which take advantage of DL MU-MIMO) already group like-MCS client devices. For example, a conventional scheduling algorithm would typically not contemplate a grouping of MCS0 client devices with MCS11 client devices, and so any advantage associated with boosting RU power would be negated. However, in the RF context, and as noted above, use of boosting/de-boosting in the manner disclosed herein can be an effective way to manage/maintain PA linearity.

If RU power boosting/de-boosting, however, is unsupported by the radio chip (FIG. 2), a mechanism for OFDMA grouping may be applied. It should be noted that conventional OFDMA grouping mechanisms exist, but are premised on a rigid grouping of MCSs. Conventional, rigid grouping can result in smaller groups that use the lowest power associated with an MCS within a given group. For example, FIG. 5 presents an example of conventional OFDMA grouping, where twelve MCS rates (MCS0-MSC11) are divided into four groups of three MCSs each. Based on PA linearity characteristics, a maximum RF power at which each transmission rate/MCS can transmit is reflected as follows. For MCS0-2, the maximum power is 17 dBm (commensurate with the lowest maximum power associated with any of MCS0-2). Thus, for all client devices using MCS0-2, the power used will be 17 dBm. For MCS3-5, the group maximum power is 15.5 dBm (commensurate with the max power possible while retaining PA linearity associated with MCS5). Thus, for all client devices using MCS3-5, the power used will be 15.5 dBm. Similarly, the maximum group power of MCS6-8 is 13 dBm, and the maximum group power of MCS9-11 is 10 dBm. Thus, even though PA linearity-limited powers allow for, e.g., 15 dBm, 14 dBm, and 13 dBm (in the case of MCS6-8) the power is limited to 13 dBm. Of course, this topology may have a slight SNR impact on MCS6 and could impact the range of MCS6 client devices in sparse deployments.

Another shortcoming of conventional, rigid OFDMA grouping can be seen at the boundary of two high modulation groups. Consider an OFDMA group including MCS6, MCS7, MCS8 and MCS9 client devices. When transmitting a burst containing MCS9, the algorithm will force MCS6, MCS7 and MCS8 (slightly lower SNR clients) out of the transmission. In most practical deployments, because of obstructions, there are more MCS6, MCS7 and MCS8 clients than MCS9, MCS10 and MCS11 clients. Hence, rigid grouping could lead to serious latency issues for MCS6, MCS7 and MCS8 client devices.

In accordance with various embodiments, a new/additional grouping algorithm can be used, following this example, where MCS10 and MCS11 (1024-QAM modulation) is not used. Instead, MCS9 may be used for those MCS10 and MCS11 client devices. In this way, even without the ability to boost/de-boost RU power, various embodiments are nevertheless, able to accommodate larger numbers of high modulation client devices, and still have reduced latency (at a slight instantaneous throughput penalty for true MCS10/MCS11 client devices). It should be understood that "true" in this context, can refer to client devices once using/supposed to use, in this example, MCS10/MCS11 prior to grouping in accordance with various embodiments. That is, MCS10/MCS11 client devices have sufficiently good SNR to handle MCS10/MCS11 modulations, but are restricted to MCS9 in accordance with one embodiment.

Figure 6A:
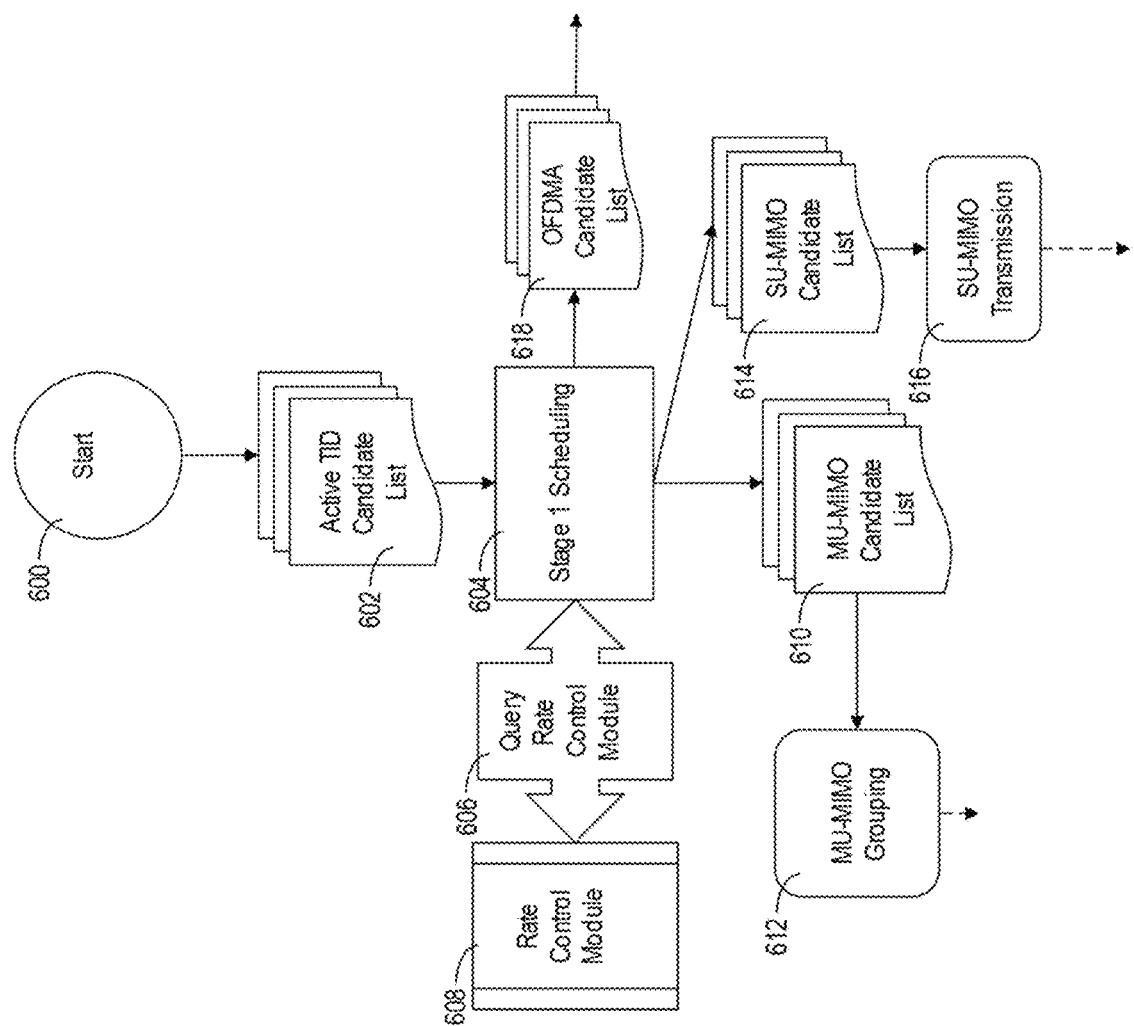
FIG. 6A illustrates a first aspect of transmission scheduling in accordance with various embodiments.
Figure 6B:
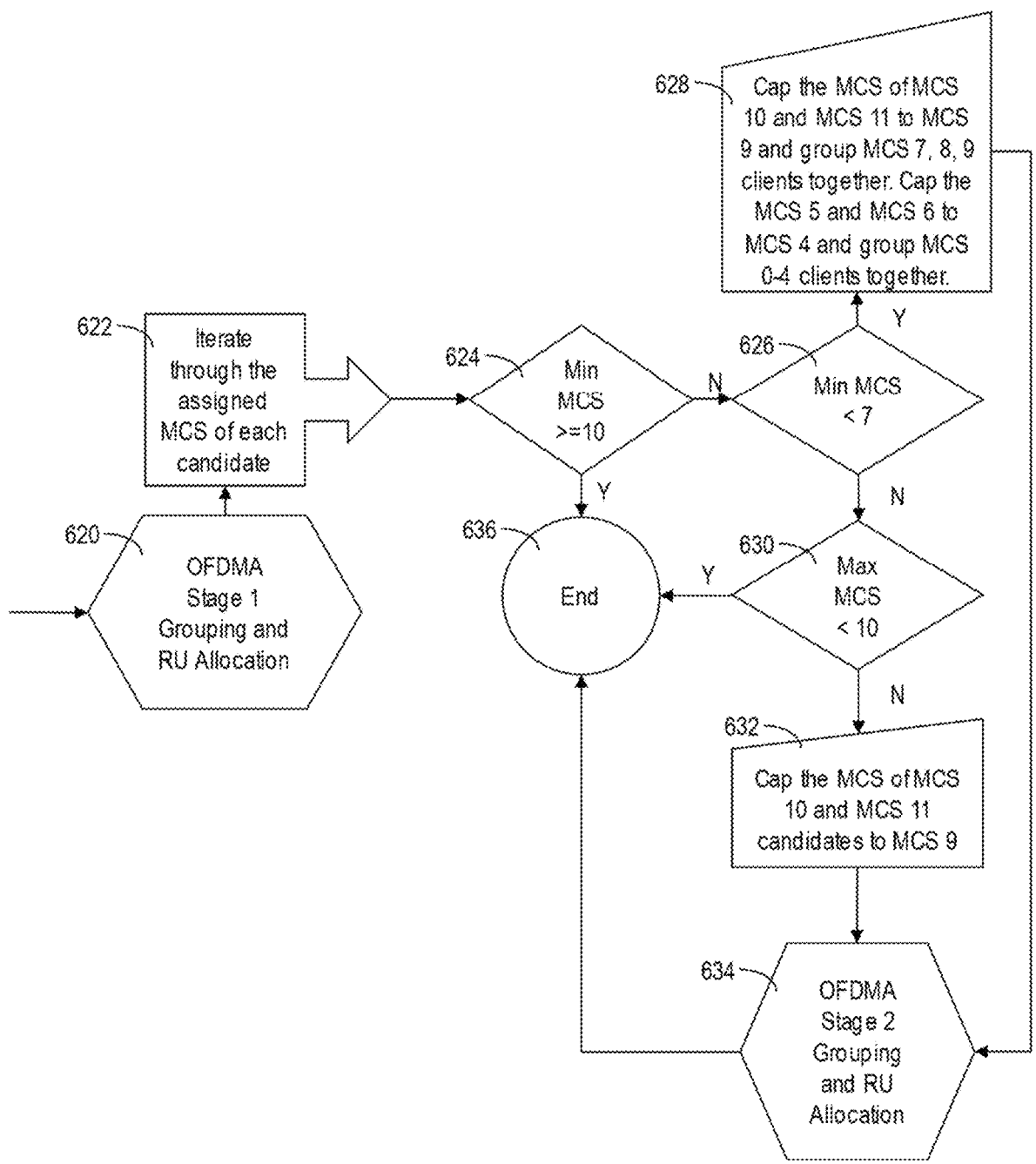
FIG. 6B illustrates a second aspect of transmission scheduling involving enhanced orthogonal frequency division multiple access grouping in accordance with various embodiments.

FIGS. 6A and 6B illustrate a flow chart of operations that may be performed to achieve enhanced OFDMA grouping in accordance with one embodiment. It should be understood that FIG. 6A represents operations that may already be performed in accordance with conventional AP scheduling, but lead to application of enhanced grouping as disclosed herein. The grouping algorithm starts at operation 600, and proceeds to operation 602, which involves activating a traffic identifier (TID) candidate list, i.e., those users or candidates with active TID queues are considered. It should be understood that WLAN packets can be streams of video, voice, data, each of which may have a different priority to be served by an AP. The TID can be used to classify a packet such that upon receipt of a frame, a certain priority can be assigned based on the TID associated with the frame.

At operation 604, stage 1 scheduling may be performed by, at operation 606, querying the rate control module 608 which can choose between fixed rate assignment and rate adaption based, e.g., on current channel conditions. That rate can be returned, based on thereon, at operation 610, a MU-MIMO candidate list can be derived, and at operation 612, based on the candidate list, candidates/client devices can be grouped. For SU-MIMO, at operation 614, another candidate list can be determined, after which, at operation 616 SU-MIMO transmissions from those candidates/client devices may commence. That is, the scheduler (scheduling mechanism effectuated through instructions stored in a memory of an AP and executed by a processor of the AP) may select a particular transmit mode based on various considerations, including, e.g., the number of client devices/candidates at issue, their respective capabilities, respective queue depths (indicating the amount of traffic to be sent from each client device), and rate assigned to each client device by the rate control module 608. At operation 618, an OFDMA candidate list is considered, where the MCS value is assigned to each user/client device.

As illustrated in FIG. 6B, at stage 1, and based on standard Physical Layer Convergence Protocol (PLCP) Protocol Data Unit (PPDU) duration, the rate and the amount of traffic to be sent for the client device, an RU allocator module or component of an AP groups the client devices, and assigns the RUs to the client devices. It should be understood that an AP may have a processor and memory containing instructions that when executed cause the processor to perform RU allocation, as well as OFDMA grouping as disclosed herein.

At operation 622, the method progresses by iterating through the assigned MCS of each of the candidates/client devices in the OFDMA candidate list.

At operation 624, a check may be performed to determine if the minimum MCS in a given group is greater than 10. If so, a PPDU can be transmitted with the default power assigned to each client device based on the rate, as PA linearity can be met. That is, and in this example, if the minimum MCS in a group is MCS10, only MCS10/MCS11 clients devices need to be addressed in one transmit burst. Thus, the PA need not deal with low and high SNR clients at the same time, and linearity issues are avoided. If the minimum MCS of the given group is less than 10, a check may be performed at operation 626 to determine If the minimum MCS is less than 7. If so, at operation 628, the MCS of MCS 10 and MCS 11 may be capped at/dropped to MCS 9, and MCS 5 and MCS 6 are dropped/capped to MCS 4. Additionally, two buckets or groups covering MCS ranges MCS0-MCS4 and MCS7-MCS9 can be created.

The process my proceed to operation 634, where a second stage, stage 2, of RU allocation and grouping can be performed with respect to the two sets of client devices. It should be noted that operation 634 is performed to account for the fact that RU requirements will change because of a change in transmission rate. In stage 2, therefore, the RU sizes in a given group are re-calculated, and the PPDU can be transmitted.

If the minimum MCS is greater than or equal to MCS7 (operation 626), at operation 630, a check is performed to determine if the maximum MCS in the group is less than 10. This can refer to the case of MCS7, MCS8, and MCS9 belonging to a group, and transmission of data can occur using the default transmit power values assigned (assigned transmit power values based on conventional rigid grouping). If the minimum MCS is indeed greater than or equal to MCS7, and the maximum MCS is greater than MCS9, i.e., MCS7, 8, 9, 10, and 11 are grouped together, the MCS of MCS10 and MCS11 are dropped/capped to MCS9 at operation 632. It should be understood that operation 630, by virtue of checking whether the maximum MCS is less than 10, accounts for checking if a maximum MCS is greater than 9. Thereafter, and again, at operation 634, stage 2 RU allocation and grouping can be performed.

It should be noted that the checks and caps according to MCS described above with respect to, e.g., FIG. 6B and otherwise described herein, are merely examples provided in the context of a given group of MCS (in this example MCS0-MCS11). As noted above, other MCSs exists/may be used, and various embodiments can be adapted accordingly. That is, grouping in accordance with various embodiments can be flexible, and in general, is premised on dropping the highest MCS rates to one or two lower MCS rates. This allows for more client devices to be covered/serviced with less MCS rates in a group, thus allowing the PA to remain linear.

Figure 7:
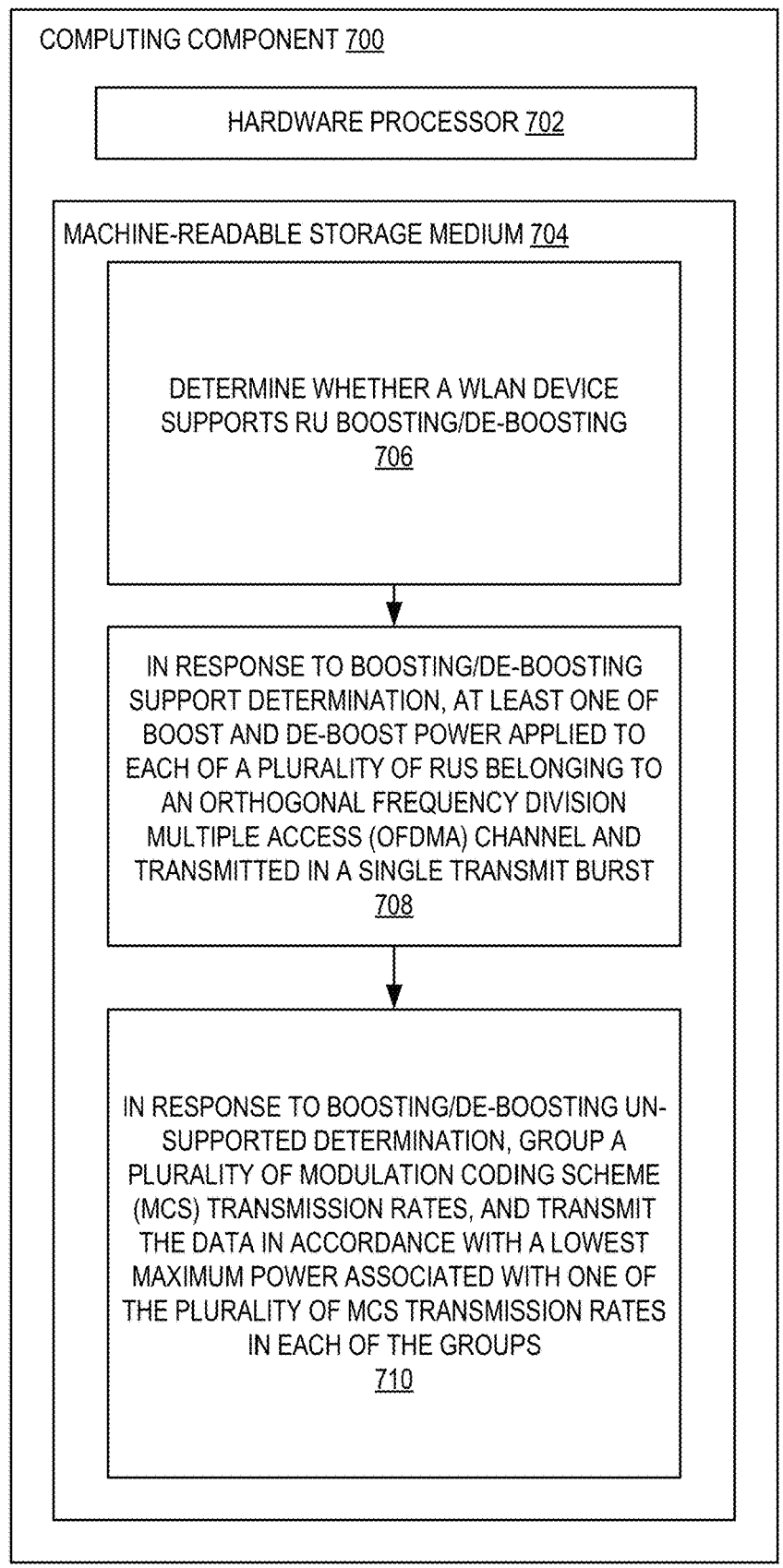
FIG. 7 is a block diagram of an example computing component or device for optimizing scheduling of orthogonal frequency division multiple access downlink transmissions in accordance with one embodiment.

FIG. 7 is a block diagram of an example computing component or device 200 for optimizing scheduling of downlink OFDMA transmissions in accordance with one embodiment. Computing component 700 may be, for example, a server computer, a controller, or any other similar computing component capable of processing data. In the example implementation of FIG. 7, the computing component 700 includes a hardware processor, 702, and machine-readable storage medium, 704. In some embodiments, computing component 700 may be an embodiment of an AP or AP controller, e.g., AP 106b or AP controller 104, respectively, of FIG. 1.

Hardware processor 702 may be one or more central processing units (CPUs), semiconductor-based microprocessors, and/or other hardware devices suitable for retrieval and execution of instructions stored in machine-readable storage medium, 204. Hardware processor 702 may fetch, decode, and execute instructions, such as instructions 706-710, to control processes or operations for grouping client devices based on traffic compatibility. As an alternative or in addition to retrieving and executing instructions, hardware processor 702 may include one or more electronic circuits that include electronic components for performing the functionality of one or more instructions, such as a field programmable gate array (FPGA) or application specific integrated circuit (ASIC).

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 702 may be a non-transitory storage medium, where the term "non-transitory" does not encompass transitory propagating signals. As described in detail below, machine-readable storage medium 702 may be encoded with executable instructions, for example, instructions 706-710 for optimizing OFDMA downlink transmission scheduling.

Hardware processor 702 may execute instruction 706 to determine whether a WLAN device, such as an AP, supports RU boosting/de-boosting. It should be understood that based on the radio chipset, this capability is known.

Hardware processor 702 may execute instruction 708 to, in response to a determination that RU boosting/de-boosting is supported, at least one of boost and de-boost power applied to each of a plurality of RUs belonging to an OFDMA channel and transmitted in a single transmit burst. As noted above, each of the RUs assigned to carry data transmitted by a different client device associated to the WLAN device is boosted/de-boosted such that an average input power to a PA of the WLAN device remains below a saturated output power of the PA. In this way, both high throughput/nearby client devices as well as low throughput/distant client devices can be supported without adversely impacting the linearity of the PA(s).

Hardware processor 702 may execute instruction 710 to, in response to determining boosting/de-boosting of RUs is unsupported, group a plurality of MCS transmission rates, and transmit the data in accordance with a lower maximum power associated with one of the plurality of MCS transmission rates in each of the groups. Unlike conventional rigid grouping, the highest MCS rates in a group can be dropped to one or two lower MCS rates, such that more client devices can be covered/serviced with less MCS rates, thus allowing the PA to remain linear.

It should be understood that OFDMA is a key feature in the 802.11ax (also referred to as WiFi 6) standard because it improves efficiency and reduces latency by grouping a large number of clients (up to 37 in a 80 MHz channel bandwidth). Typical vendor algorithms group client devices in an OFDMA transmission based on the MCS assigned to them which is sub-optimal. Grouping based on MCS would result in smaller sized groups and hence increase latency. In accordance with various embodiments, the overall throughput may be impacted by a small percentage because transmission rates are reduced. However, overall, the disclosed mechanism is more efficient in terms of improving latency. In an enterprise deployment, the applications' performance suffer because of latency requirements not being met and not because of throughput. Moreover, cost savings can be realized in the hardware platform by not requiring the use of, e.g., expensive PAs for use in boosting the range of higher modulation client devices, that nevertheless are still victim to the throughput versus range tradeoff.

Figure 8:
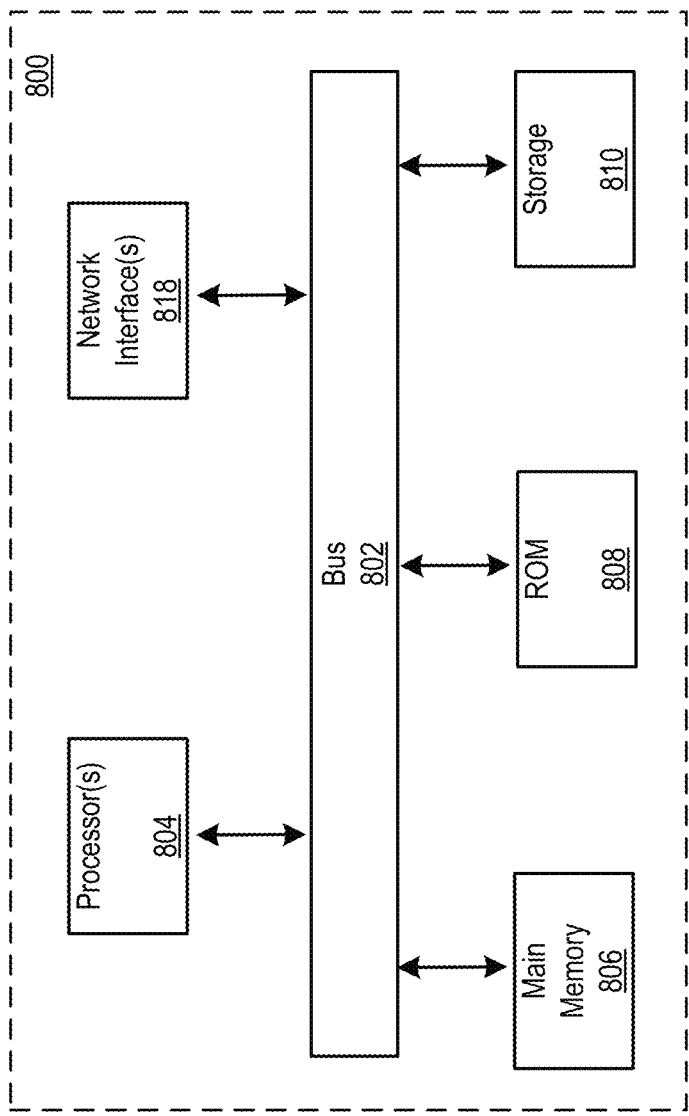
FIG. 8 is an example of a computing component that can be used in conjunction with various embodiments of the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A wireless local area network (WLAN) device, comprising:
   a processor; and
   a memory unit operatively connected to the processor and including computer code executable by the processor to:
   determine whether the WLAN device supports boosting and de-boosting of resource units (RUs);
   in response to a determination that the WLAN device supports boosting and de-boosting, at least one of one of boost and de-boost power applied to each of a plurality of RUs belonging to an orthogonal frequency division multiple access (OFDMA) channel and transmitted in a single transmit burst, each of the RUs assigned to carry data transmitted to a client device, such that an average input power to a power amplifier (PA) of the WLAN device remains below a saturated output power of the PA; and in response to a determination that the WLAN device does not support boosting and de-boosting, group a plurality of modulation coding scheme (MCS) transmission rates, and transmit the data in accordance with a lowest maximum power associated with one of the plurality of MCS transmission rates in each of the groups.

2. The WLAN device of claim 1, wherein a difference between the average input power and the saturated output power comprises a backoff power equal to or lower than a power associated with a most complex MCS transmission rate of the plurality of MCS transmission rates in the single transmit burst.

3. The WLAN device of claim 1, wherein the average input power remains approximately 6-8 dB below the saturated output power of the PA.

4. The WLAN device of claim 1, wherein the PA remains linear across all MCS transmission rates supported by each of the plurality of RUs.

5. The WLAN device of claim 1, wherein the power applied to a first subset of the plurality of RUs is boosted, the first subset of RUs being used to at least one of access and communicate with a first subset of corresponding client devices.

6. The WLAN device of claim 4, wherein the power applied to a second subset of the plurality of RUs is de-boosted, the second subset of RUs being used to at least one of access and communicate with a second subset of corresponding client devices.

7. The WLAN device of claim 5, wherein each of the second subset of corresponding client devices are geographically nearer to the WLAN device than each of the first subset of corresponding client devices.

8. The WLAN device of claim 1, wherein the memory unit comprises computer code that when executed, further causes the processor to select a transmit mode.

9. The WLAN device of claim 8, wherein the memory unit comprises computer code that when executed, further causes the processor to, upon selection of an OFDMA transmit mode, receive an OFDMA candidate list, the OFDMA candidate list including an initial assignment of MCS transmission rates to each of the different client devices.

10. The WLAN device of claim 9, wherein the memory unit comprises computer code that when executed, further causes the processor to group subsets of the different client devices based on Physical Layer Convergence Protocol (PLCP) Protocol Data Unit (PPDU) duration, rate at which traffic is to be sent for each of the different client devices, and an amount of traffic to be sent for each of the different client devices.

11. The WLAN device of claim 9, wherein the memory unit comprises computer code that when executed, further causes the processor to assign each of the RUs to each of the different client devices.

12. An access point, comprising:
a processor; and
a memory unit operatively connected to the processor and including computer code executable by the processor to:

analyze an initial grouping of modulation coding scheme (MCS) transmission rates assigned to each of a plurality of client devices associated to the access point;

adjust the initial grouping the MCS transmission rates in accordance with maximum radio frequency (RF) power levels at which traffic to the plurality of client devices are to be transmitted associated with each of the MCS transmission rates such that the traffic is transmitted with a lowest maximum power associated with one of the plurality of MCS transmission rates in each of the adjusted groups of MCS transmission rates.

13. The access point of claim 12, wherein the memory unit comprises computer code that when executed, further causes the processor to boost power applied to each of a first subset of a plurality of resource units (RUs) assigned to carry data for a corresponding first subset of the plurality of client devices.

14. The access point of claim 13, wherein the memory unit comprises computer code that when executed, further causes the processor to de-boost power applied to each of a second subset of the plurality of RUs assigned to carry data for a corresponding second subset of the plurality of client devices.

15. The access point of claim 14, wherein each of the second subset of the plurality of client devices is geographically nearer to the WLAN device than each of the first subset of the plurality of client devices.

16. An access point, comprising:
a processor; and
a memory unit operatively connected to the processor and including computer code executable by the processor to, if boosting and de-boosting of resource units (RUs) is enabled:
boost power applied to each of a first subset of the RUs assigned to carry data for a corresponding first subset of client devices associated to the access point; and
de-boost power applied to each of a second subset of the RUs assigned to carry data for a corresponding second subset of the plurality of client devices, such that an average input power to a power amplifier (PA) of the access point remains below a saturated output power of the PA.

17. The access point of claim 16, wherein a difference between the average input power and the saturated output power comprises a backoff power equal to or lower than a power associated with a most complex MCS transmission rate of the plurality of MCS transmission rates in the single transmit burst.

18. The access point of claim 16, wherein the average input power remains approximately 6-8 dB below the saturated output power of the PA.

19. The access point of claim 16, wherein the PA remains linear across all MCS transmission rates supported by each of the RUs.

20. The access point of claim 16, wherein the memory unit comprises computer code that when executed, further causes the processor to, in response to a determination that boosting and de-boosting of RUs is not enabled, group a plurality of modulation coding scheme (MCS) transmission rates, and transmit the data in accordance with a lowest maximum power associated with one of the plurality of MCS transmission rates in each of the groups.

* * * * *